United States Patent [19]

Tada et al.

[11] 4,209,868
[45] Jul. 1, 1980

[54] FIXED SUPPORT STRUCTURE

[75] Inventors: Hiroshi Tada, Yokohama; Toshiro Nozu, Tokyo, both of Japan

[73] Assignee: Oiles Industry Co. Ltd., Tokyo, Japan

[21] Appl. No.: 935,670

[22] Filed: Aug. 21, 1978

[30] Foreign Application Priority Data

Aug. 29, 1977 [JP] Japan ................... 52-103438
Jun. 7, 1978 [JP] Japan ................... 53-67832

[51] Int. Cl.² ................................... E01D 19/06
[52] U.S. Cl. ........................... 14/16.1; 52/167; 248/181
[58] Field of Search ............... 14/16.1; 248/188.3, 248/188.2, 19, 181; 52/573, 167

[56] References Cited
U.S. PATENT DOCUMENTS

| 592,852 | 11/1897 | Westwood | 14/16.1 |
| 1,829,964 | 11/1931 | Randall | 248/181 X |
| 2,705,928 | 4/1955 | Pont | 52/167 X |
| 3,311,329 | 3/1967 | Lakitsky | 14/16.1 X |
| 3,347,002 | 10/1967 | Penkuhn | 52/167 |
| 3,606,704 | 9/1971 | Denton | 52/167 |
| 3,806,975 | 4/1974 | Fyfe | 14/16.1 |

*Primary Examiner*—Nile C. Byers, Jr.
*Attorney, Agent, or Firm*—George B. Oujevolk

[57] ABSTRACT

A fixed support structure comprising a pair of support units each including a housing and a ball stud having a ball portion placed in the housing and a threaded shank portion, which are formed integrally with the ball portion, the ball stud shank portions extending downward for the respective housings, the housings fixed to an upper structure such as a bridge girder directly or indirectly in spaced relation, and the ball stud shank portions threadedly fixed to a retainer fixed on a base plate fixed to a lower structure such as a bridge base.

3 Claims, 7 Drawing Figures

[4,209,868]

FIXED SUPPORT STRUCTURE

BACKGROUND OF THE INVENTION

1. Field of the Invention

The invention relates to a fixed support structure comprising a pair of support units each including a housing and a ball stud formed with a ball portion placed in the housing and a threaded shank portion with the ball portion, the ball stud shank portion extending downward from the housing. The housing is fixed to an upper structure such as a bridge girder in spaced relation, and the ball stud shank portions threadedly to a retainer fixed on a base plate fixed to a lower structure such as a bridge base.

2. Brief Description of the Prior Art

Monorail railways which are generally narrower in girder width as compared with overhead roads and suspension railways are required to have a capacity to bear lifting forces caused by vertical and horizontal loads and tipping moments acting on the girders due to vehicle centrifugal forces and wind loads. Additionally, in monrail railways it is always necessary that the adjustment of the vertical and horizontal position and the inclination of the girders be readily made, since the girders are used as rails.

Like normal overhead roads, monorail railways are also required to accommodate the expansion and contraction of the girders. For this purpose, it has been proposed to construct specified bridge bases in fixed support structure so as to provide an inclination and deflection accommodating function and other bridge bases in movable support structure so as to allow the girders to move axially of the bridge.

In order to satisfy these requirements, various attempts have been made. For example, curved-surface or roller-shaped support members have been interposed between the bridge girders and the bridge bases connected each other by means of anchor bolts. However, such an arrangement is complex in structure, expensive to produce, and trouble to assemble.

SUMMARY OF THE INVENTION

Therefore, it is an object of the present invention to provide a fixed support structure where the vertical position of the bridge girder can be easily adjusted by rotation of the ball stud of the support unit.

Another object of the present invention is to provide a fixed support structure in which the vertical position of the bridge girder can be easily adjusted by rotation of the ball stud of the support unit and also the horizontal position of the bridge girder can be easily adjusted by rotation of the first and second eccentric discs fitted in the hole of the retainer, and also which can sufficiently accommodate the lifting force and load exerting on the lower structure such as a bridge girder.

Also, another object of the present invention is to provide that the inclination of the bridge girder can be adjusted by sliding movement between the ball portion of the ball stud arranged and the support disc fitted in the housing fixed to the upper structure.

DETAILED DESCRIPTION OF THE INVENTION

Figure 1:
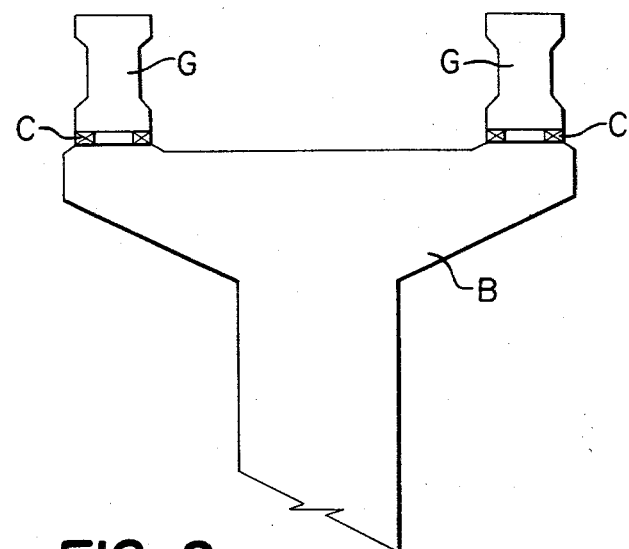
FIG. 1 is an elevational view of a double track monorail railway.
Figure 2:
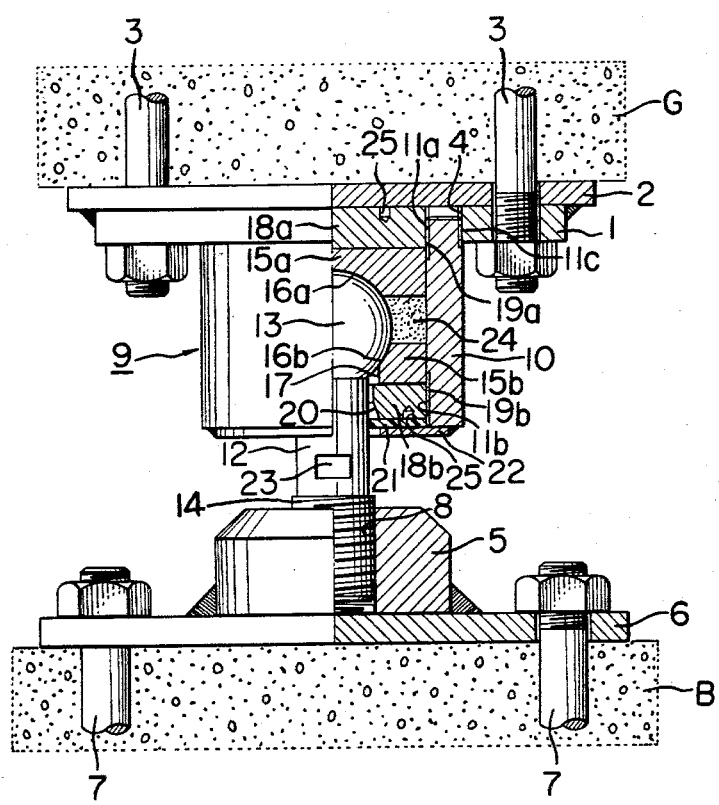
FIG. 2 is a fragmentary elevational view in section showing the fixed support structure of the present invention.
Figure 3:
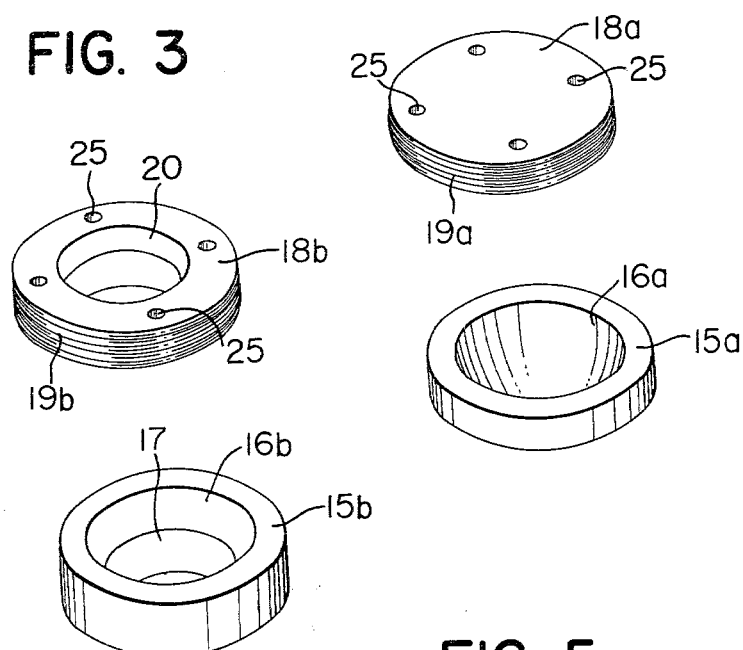
FIG. 3 is a perspective view showing push discs and support discs used in the fixed support structure of the present invention.

The invention will be described in more detail with reference to the accompanying drawings. In the figures, the letter G indicates an upper structure such as a bridge girder, the letter B a lower structure such as a bridge base, and the letter C support units. The numeral 1 designates a sole disc plate fixed through a bottom plate 2 to the upper structure G such as a bridge girder by means of anchor bolts 3 and formed with a threaded hole 4, and the numeral 5 a retainer fixed through a bottom plate 6 to the lower structure B such as a bridge base by means of anchor bolts 7 and formed with a threaded hole 8.

The numeral 9 indicates a support unit, the numeral 10 a cylindrical housing having its inner surface formed at its opposite sides with threaded portions 11a and 11b and its outer surface formed at its one end with a threaded portion 11c, the numeral 12 a ball stud having at its one end a ball portion 13 and at the other end a threaded shank portion 14, and the numerals 15a and 15b support discs, the support disc 15a having a spherical concave 16a configurated for entry of the ball portion 13 thereinto and the support disc 15b having a spherical surface 16b with a hole 17 through which the shank portion 14 of the ball stud 12 extends from the housing 10.

The numeral 18a and 18b indicate push discs formed in their outer peripheral surfaces with respective threaded portions 19a and 19b. The push disc 18b is formed with a tapered hole 20 through which the shank portion 14 of the ball stud 12 extends from the housing 10 and which serves to accommodate the inclination (deflection) of the bridge girder.

The numeral 21 designates a seal ring for sealing the hole 17 formed in the support disc 15b and the tapered hole 20 formed in the push disc 18b so as to prevent entry of foreign matters, the numeral 22 a retaining plate for retaining the seal ring 21, the numeral 23 a flat cutout portion formed in the shank portion 14 of the ball stud 12, the numeral 24 a lubricating anticorrosive charged in the gap defined by the housing 10, the support discs 15a and 15b, and the ball portion 13 of the ball stud 12, and the numeral 25 orifices formed in the push discs 18a and 18b.

The support unit 9 of the fixed support structure of the present invention is assembled in the following manner:

The support disc 15a is inserted from one end of the housing 10 and fitted therein with its spherical concave 16a facing the other end of the housing 10. The push disc 18a has its threaded portion 19a threadedly engaged with the threaded portion 11a of the housing 10 so as to be attached in the housing 10 in pressure contact with the support disc 15a. The ball stud 12 is inserted into the housing 10 and its ball portion 13 is placed into contact with the spherical concave 16a of the support disc 15a and its threaded shank portion 14 extending from the other end of the housing 10. The support disc 15b is inserted from the other end of the housing 10 and fitted therein with its spherical surface 16a placed in contact with the ball portion 13 of the ball stud 12 and the threaded shank portion 14 extending through the hole 17 formed in the support disc 15b. The push disc 18b has its threaded portion 19b threadedly engaged with the threaded portion 11b of the housing 10 so as to be attached in the housing 10 in pressure contact with the support disc 16b and the ball stud 12 extending through the tapered hole 20 formed in the push disc 18b. The seal ring 21 for sealing the hole 17 of the support disc 15b and the tapered hole 20 of the push disc 18b is set to the other end of the housing 10 and is fastened by the retaining plate 22.

The support unit 9 assembled as described above has its threaded shank portion 19 of the ball stud 12 threadedly engaged with the threaded hole 8 of the retainer 5 fixed to the lower structure B and the housing 10 has its threaded portion 11c threadedly engaged with the threaded hole 4 of the sole plate 1 fixed to the upper structure G. The retainer 5 is fixed to the bottom plate 6 after position adjustment.

In the above support structure as arranged in accordance with the present invention, the vertical position of the bridge girder is adjusted by rotation of the ball stud 12 of the support unit 9 in one direction utilizing the flat cutout portion 23 formed in the shank portion 14 of the ball stud 12. The inclination of the bridge girder is adjusted by sliding movement between the ball portion 13 of the ball stud 12 fixed to the lower structure B and the support discs 15a and 15b fitted in the housing 10 fixed to the upper structure G. Adjustment on the horizontal position of the bridge girder and upon bridge girder attachment is effected during the retainer 5 is not fixed to the bottom plate 6. The retainer 5 is fixed to the bottom plate 6 such as by welding after these adjustments. Restriction to the inclination is effected by the abutment between the ball stud 12 and the tapered hole 20 of the push disc 18b.

Although the support unit 9 is described as fixed to the upper structure G by threaded engagement with the sole plate 1, it may be inserted under pressure into the sole plate 1 and welded thereto. Also, the bottom plates 2 and 6 serve to facilitate the fixture between the support units and the upper structure and lower structure G and B and may be removed if the sole plate 1 and the retainer 5 are directly fixed to the upper structure G and lower structure B.

Figure 5:
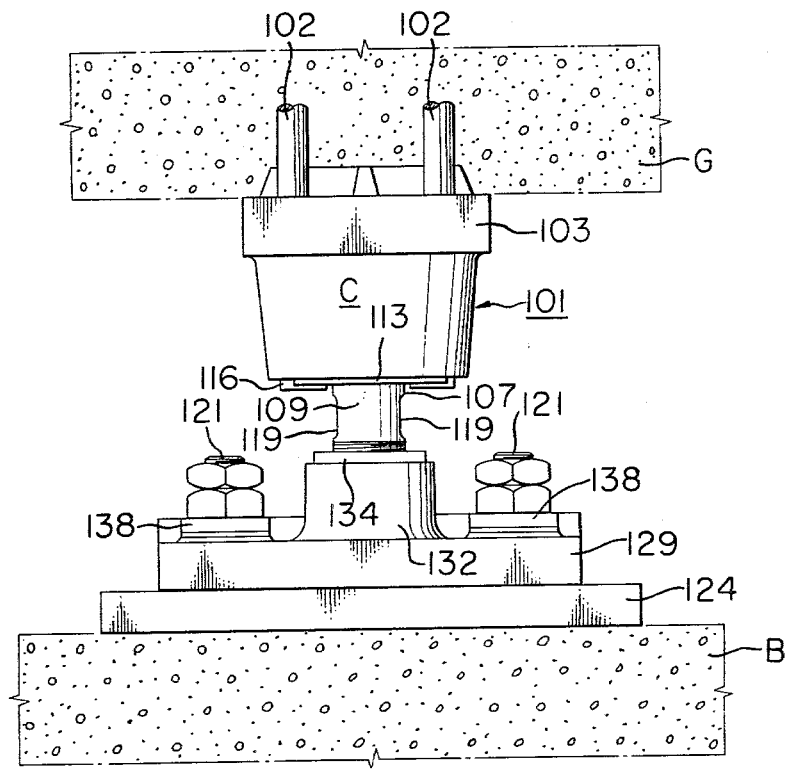
FIG. 5 is a side view thereof.
Figure 4:
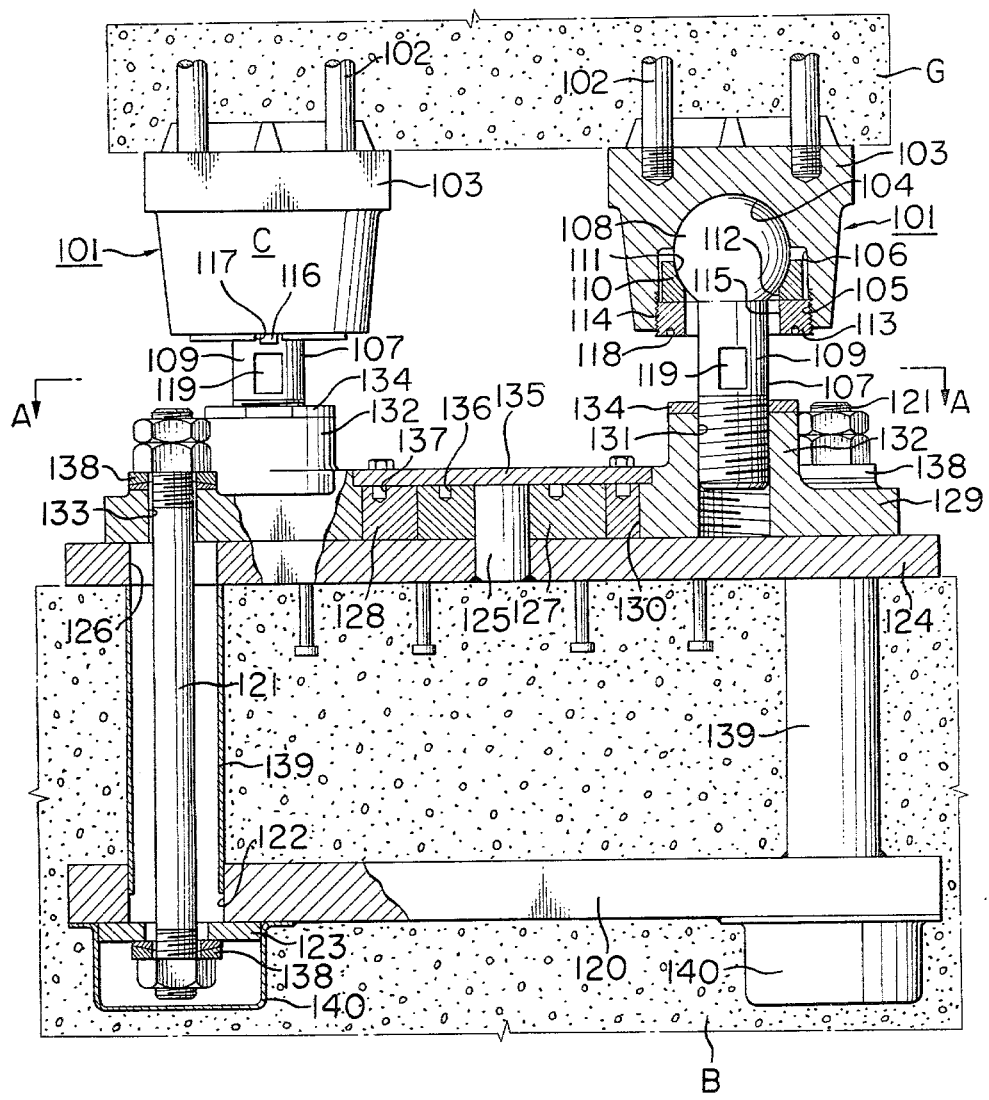
FIG. 4 is an elevational view in section showing an alternative embodiment of the fixed support structure of the present invention.
Figure 6:
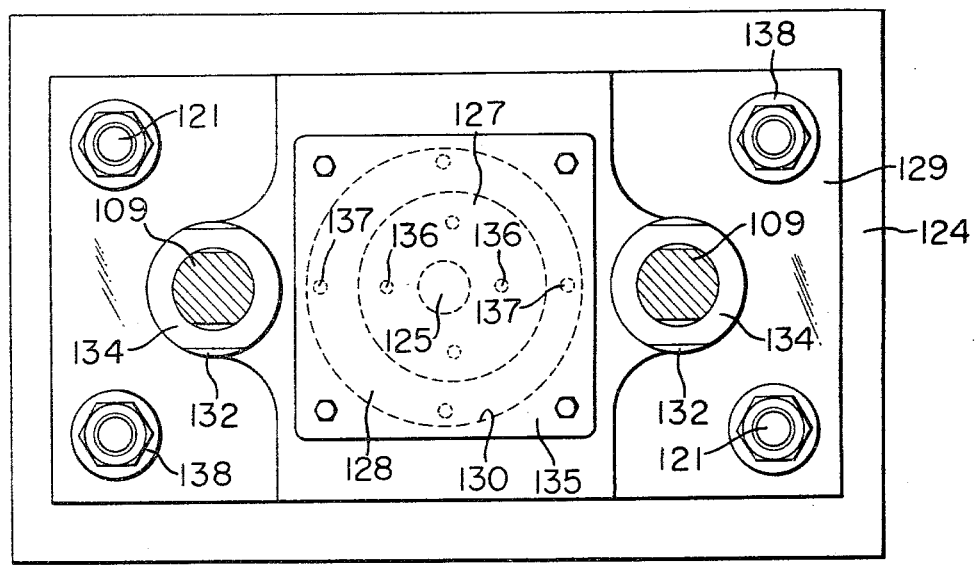
FIG. 6 is a sectional view taken along the line A—A of FIG. 4.
Figure 7:
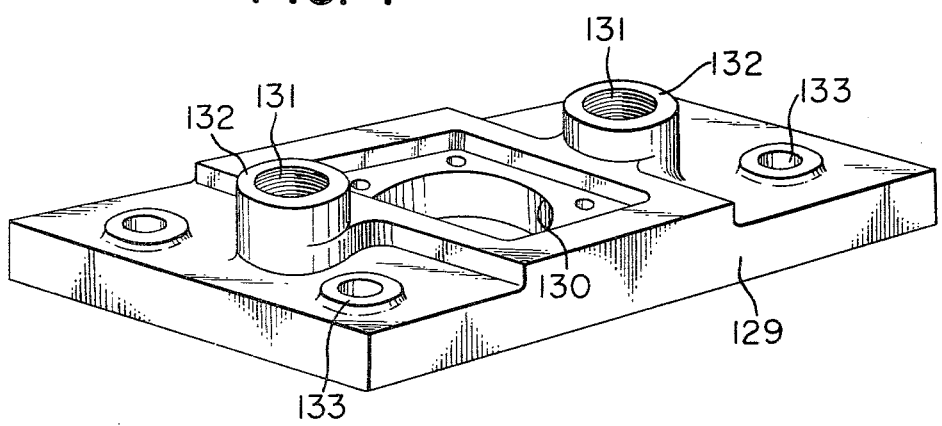
FIG. 7 is a perspective view of the holding member.

FIGS. 4, 5, 6 and 7 illustrate an alternative embodiment of the present invention in which the support unit 101 fixed to the upper structure G has a housing 103 formed at its one end with a spherical concave portion 104 and at its opening end with a threaded portion 105 instead of the above-mentioned cylindrical housing 10. An anchor plate 120 and a base plate 124 are embedded in the lower structure B. The anchor plate 120 is formed with holes 122 and 122 through which lock bolts 121 and 121 extend and fixed thereto through washers 138 and 138 which are covered by covers 140 and 140. The base plate 124 is formed with holes 126 and 126 through which the lock bolts 121 and 121 extends and fixed thereto through washers 138 and 138. The base plate 124 is embedded in the lower structure B with its pin 125 extending upward therefrom.

First and second eccentric discs 127 and 128 are provided on the base plate 124 such that the first eccentric disc 127 can rotate around the pin 125 in sliding contact therewith and the second eccentric disc 128 can rotate around the first eccentric disc 127 in sliding contact therewith. Thereafter, the retainer 129 is placed on the base plate 124 by threadedly engaging the ball stud 107 of the support unit having its shank portion 109 inserted through the holes 112 of the support disc 110 and the holes 115 of the push disc 113 with the threaded portions 131 and 131 formed in the retainer, inserting the second eccentric disc 128 in the through-hole 130 of the retainer, and inserting the lock bolts 121 and 121 in the bolt holes 133 and 133.

If there is any error in the horizontal position (the position axial of the bridge and normal to the bridge axis) of the ball stud 107 of the support unit 101 retained by the retainer 129 under this condition, the position of the ball stud 107 of the support unit retained by the retainer 129 can be adjusted by rotation of the first and second eccentric discs 127 and 128 placed in the through-hole 130 of the retainer in one direction using jigs (not shown) inserted in jig holes 136 and 137 formed in the first and second eccentric discs 127 and 128.

By rotation of both or either of the first eccentric disc 127 rotatably fitted around the pin of the base plate 124 and the second eccentric disc 128 rotatably fitted around the first eccentric disc 127 about the pin 125 in the same or opposite directions, the position of the retainer 129 with its through-hole 130 holding the first and second eccentric discs 127 and 128 can be adjusted in the range within the maximum movable distance e (cm) expressed by $e=2(e'+e'')$ where $e'$ is eccentric amount of the first eccentric disc 127 and $e''$ is the eccentric amount of the second eccentric disc 128 assuming $e'=e''$. In order to avoid any trouble even if the position of the bolt holes 133 and 133 of the retainer varies with respect to the axial line of the anchor plate 120 embedded in the lower structure B and the holes 122 and 126 of the base plate 124, and the protecting cylinder 139 for protecting the lock bolts 121 and 121 are made larger in size than the diameter of the lock bolts 121 and 121 to allow their movement in accordance with the variation.

Even if the variation causes slant movement of the lock bolts 121 and 121, any gap cannot be generated among the surfaces of the lock bolts 121 and 121, the retainer 129, and the plate 123 since the washers 138 and 138 have concave and convex spherical surfaces in sliding contact with each other to accommodate such slant movement.

The vertical position of the support unit 101 held by the retainer 129 or the ball stud 107 is adjusted by rotation of the ball stud 107 threadedly engaged with the threaded portion 131 formed in the lock portion 132 of the retainer 129 in one direction utilizing the flat cutout portion 119 formed in the shank portion. After such adjustment, the ball stud 107 is fixed to the lock portion 132 of the retainer 129 by means of lock nuts 134 and 134. Thereafter, the retainer 129 is fixed through the base plate 124 to the lower structure B by means of the lock bolts 121 and 121. Then, the upper structure G is connected as a unit to the lower structure B through the fixed support C as follows: The housing 103 of the support unit fixed to the upper structure G is placed around the ball stud 107 fixed to the lower structure B and previously provided with the support disc 110 and the push disc 113 such that the ball stud ball portion 108 comes into sliding contact with the spherical concave portion 104 of the housing 103 and the support disc 110 pushed by push disc 110 having its threaded portion 114 threadedly engaged with the threaded portion 105 formed in the end of the opening 106 of the housing 103. A key 116 is inserted in the groove 117 of the push disc to fix the push disc 113 to the housing. In the figures, the numeral 118 designates a small hole formed in the push disc 113, the numeral 119 a flat cutout portion formed in the ball stud shank portion 109, and the numeral 135 a cover for covering the through-hole 130 of the retainer.

With the above fixed support structure of the present invention, the vertical position adjustment of the bridge girder required in monorail railway girders can be easily effected by rotation of the ball stud 107 of the support unit. Also, the horizontal position thereof can be adjusted by rotation of the first and second eccentric discs 127 and 128 fitted in the through-hole 130 of the retainer.

Although the ball stud 107 provided with the support disc 110 and the push disc 113 and fixed to the lower structure B is coupled to the housing 103 fixed to the upper structure G after position adjustment so as to fix the upper structure G to the lower structure B, it is to be understood that the upper structure G and the lower structure B may be coupled by fixing by means of fasteners such as nuts the anchor bolts 102 embedded in the upper structure G and inserted in the holes formed in the housing 103 of the support unit fixed to the lower structure B. Alternatively, the lower structure B and the upper structure G may be coupled by fixing the support unit 101 of the fixed support C previously fixed to the upper structure G to the retainer 129 previously fixed to the lower structure B.

The support structure of the present invention is simple in structure, easy to adjust the vertical and horizontal position of the bridge girder and the inclination of the bridge girder, smooth to transmit the load exerting on the upper structure such as a bridge girder to the lower structure such as a bridge base, and effective to accommodate lifting forces.

The fixed support structure of the present invention eliminates the need for any consideration of the direction of the structure upon its installation which has been necessary in conventional support structures, resulting in higher manufacturing costs and in the efficiency of the installation.

What is claimed is:

1. A fixed support structure comprising: a pair of support units, each including a housing and a ball stud having as a unit a ball portion disposed in said housing and a threaded shank portion, said ball stud shank portion each extending downward from their respective housings, said housings being fixed to an upper structure such as a bridge girder in spaced relation, said ball stud shank portion being threadedly fixed to a retainer fixed on a base plate and fixed by lock bolts to a lower structure, said retainer being formed with a through-aperture at its center and with lock portions at both sides of said through-aperture in the direction transverse to the longitudinal axis of the bridge, each having a threaded inner surface, said lock portions being threadedly engaged with said ball stud shank portions, said retainer being fixed on said base plate having at its center a pin extending upward so that said pin is placed within said through aperture of said retainer, a first eccentric disc disposed within the space defined by said pin and said through-aperture for rotation in sliding contact therewith, and a second eccentric disc disposed around said first eccentric disc for rotation in sliding contact therewith.

2. A fixed support structure as set forth in claim 1 wherein each of said lock bolts extends through a bolt aperture formed in said base plate and a mounting aperture larger in size than an anchor plate embedded in the lower structure, said lock bolts fixing said retainer to the lower structure through a washer having a spherical concave and convex surfaces and disposed through a holder plate provided on the rear surface of said anchor plate so as to cover said mounting aperture.

3. In a fixed support structure made up of a pair of support units (101), each unit including a retainer (129), a housing (103) and a ball stud, said ball stud having a ball portion (108) disposed in said housing (103) and a threaded shank portion (109), said shank portion (109) extending downward from said housing (103), said housing (103) being fixed to an upper structure such as a bridge girder (G) in spaced relation, and said shank portion (109) being threadedly fixed to said retainer (129), said retainer (129) including a base plate (124) which in turn is fixed to a lower structure (B) such as a bridge base, in combination:

(a) an aperture (130) at the center of said retainer (129) a pin (125) extending upward of the center of said base plate (124), through said aperture, a first eccentric disc (127) rotatably disposed around said pin (125) in sliding contact therewith, a second eccentric disc (128) rotatably disposed around said first eccentric disc (127) in sliding contact therewith;

(b) lock bolts (121) coupling said retainer to said lower structure (B) on diagonally opposite sides of said aperture (130) disposed transverse to the longitudinal direction of the upper structure to which said support structure is fixed;

(c) an anchor plate embedded in said lower structure (B), parallel to said base plate (124), corresponding apertures in said base plate (124) and said anchor plate (120) with protective cylinders (139) extending between said base plate (124) and said anchor plate (120), said lock bolts (121) passing through said protective cylinders (139), the inner diameter of said protective cylinders (139) being larger than the outer diameter of said lock bolts (121); and, (d) upper and lower washer means (138) disposed above said base plate (124) and below said anchor plate (120), said washer means each having spherical concave and convex surfaces facing each other.

* * * * *